United States Patent Office

3,717,824
Patented Feb. 20, 1973

3,717,824
APPARATUS AND METHOD FOR MAGNETICALLY SCANNING AN ELECTRIC DISCHARGE GAS LASER
Carl J. Buczek, Manchester, Anthony J. De Maria, West Hartford, Carl M. Ferrar, Rockville, and Robert J. Wayne, East Hartford, Conn., assignors to United Aircraft Corporation, East Hartford, Conn.
Filed Dec. 2, 1971, Ser. No. 204,247
Int. Cl. H01s 3/10
U.S. Cl. 331—94.5          10 Claims

ABSTRACT OF THE DISCLOSURE

An apparatus and method for magnetically scanning the beam of output radiation from an electric discharge flowing gas laser are disclosed. Magnetic stabilization means are used to neutralize the effects of gas flow on the discharge plasmas which is maintained as a straight line discharge in a degenerate optical resonator. A variable intensity magnetic field is applied transverse to the discharge causing movement of the laser medium within the resonator and providing a corresponding scan of the output laser beam.

BACKGROUND OF THE INVENTION

Field of the invention

This invention relates to gas lasers and more particularly to the magnetic scan of a laser beam produced in a flowing electric discharge gas laser. The invention herein described was made in the course of or under a contract or subcontract thereunder, with the Department of the Navy.

Description of the prior art

There are a variety of applications in which the scanning of a laser beam is very strongly desired. The more common methods of laser scanning generally involve a two-step process, namely, producing a beam of laser energy in an optical resonator and, subsequently, interacting the beam with deflection means which are external to the resonator. The deflection means are often either mechanical moving devices or nonmechanical stationary devices. Since the operation of the mechanical systems requires the physical displacement of some element, these systems find limited application due to their inherent inertia, relatively low reliability, low rate of scan and susceptibility to damage in particularly adverse environments. Nonmechanical systems in which the laser beam is transmitted through an element having an index of refraction that can be varied by electrical, magnetic or acoustic means are therefore preferred. These variable refractive devices overcome most of the inherent shortcomings of the mechanical devices, but large changes in the refractive index are difficult to achieve in the materials available for this purpose, causing the scanning angles and the resolution of the laser beams so scanned to be too limited for many applications.

In addition to the mechanical and variable refractive index systems of laser scanning both of which involve the steps of first generating a laser beam and then deflecting it by means external to separate from the means generating the beam, a class of internally scanned lasers exists. The electron beam scan laser is typical of the internally scanned systems and avoids the disadvantages inherent in the above sequence. The operation and structural details of a typical electron beam scan laser are provided in the publication by R. V. Pole et al., Electron Beam Scan Laser, IEEE Journal of Quantum Electronics, July 1966, pp. 182–184. The internally scanned laser has a resonant cavity which is directionally degenerate, and sometimes transversely degenerate as well, and the losses from the cavity are made high for all modes except for one preferred mode with a mode selection device. However, the unavailability of suitable mode selection devices has limited the application of electron beam scan lasers and also has inhibited their further development.

An additional method of scanning a laser beam is available in the prior art and described in U.S. Pat. 3,521,-193, Magnetic Field Beam Scanner for Gas Lasers, issued to E. C. Wingfield et al., on July 21, 1970. The system disclosed involves three sets of magnetic coils which are positioned adjacent and/or surrounding an electric discharge gas laser; a controlled electric current is applied to the coils to generate three intersecting magnetic fields within the optical cavity of the system. The interaction of the three magnetic fields produces an axis of magnetic symmetry within the laser cavity and variations in the amplitude and phase of the current to the coils which control the magnetic field cause the magnetic beam to scan a two-dimensional area. While the teachings of this patent are conceptually feasible, there are drawbacks in their implementation. For example, the system is a non-flowing gas laser and therefore does not have the advantages of convective cooling. Also, one of the magnetic fields which is produced by a solenoid coil is needed for appropriate containment of the electric discharge; without the solenoid coil the discharge tends to fill the entire gas enclosure and assumes a dimension greater than the desired mode diameter of the optical feedback cavity. Further, excessive heating of the laser gases typically occurs in the small diameter discharge columns which the solenoid induces, and this heating tends to destroy the population inversion which is essential to laser action. While the two remaining magnetic fields can provide an ability to nonmechanically scan the electric discharge within the optical cavity, such scanning is difficult because the forces from two scanning fields are resisted by the forces from the third magnetic field imposed by the solenoid. The problem can be avoided by appropriate manipulation of the solenoid coil but the system is no longer nonmechanical.

None of the above-described techniques is ideally suited for a large number of scan laser applications such as non-mechanical cathode ray tube optical displays, nonmechanical line scanning for laser photo recognizance systems, laser moving target indicators, laser illuminators, pointing of laser radars or weapons, and optical printing or readout devices. Therefore, the development of improved scan systems is essential before many of the attractive laser applications requiring laser beam scanning can be made practical.

SUMMARY OF THE INVENTION

A principal object of the present invention is to provide a flowing gas laser which is excited by an electric discharge and provides an output beam that can be scanned by nonmechanical means. Other objects include the production of laser optical displays similar to cathode ray tube displays with laser systems having no moving parts and also the production of nonmechanical line scanning of a laser beam.

According to the present invention, an electric discharge is established across a laser gas mixture flowing through a degenerate resonant optical cavity to form a plasma which is subjected to a variable intensity magnetic field and which responds with a corresponding motion within the cavity, thereby providing a magnetically scanned laser beam.

A scan laser according to the present invention obviates the need for electro-optic methods of selecting the mode pattern produced in the laser oscillator; the precise direction of oscillation within the resonator is selected by the magnetic movement of the optical gain medium within the resonator which is degenerate. Also, a flow of laser gas is maintained transverse to the direction of the electric discharge thereby providing cooling of the laser medium and permitting continuous, high power operation. The actual laser gain medium is nonmechanically moved and no means external to the laser oscillator is required for scanning. Further, since no moving parts are required, the scan is essentially mechanically inertialess.

The foregoing and other objects, features and advantages of the present invention will become more apparent in the light of the following detailed description of the preferred embodiments thereof as illustrated in the accompanying drawing.

DESCRIPTION OF THE PREFERRED EMBODIMENT

Figure 1:
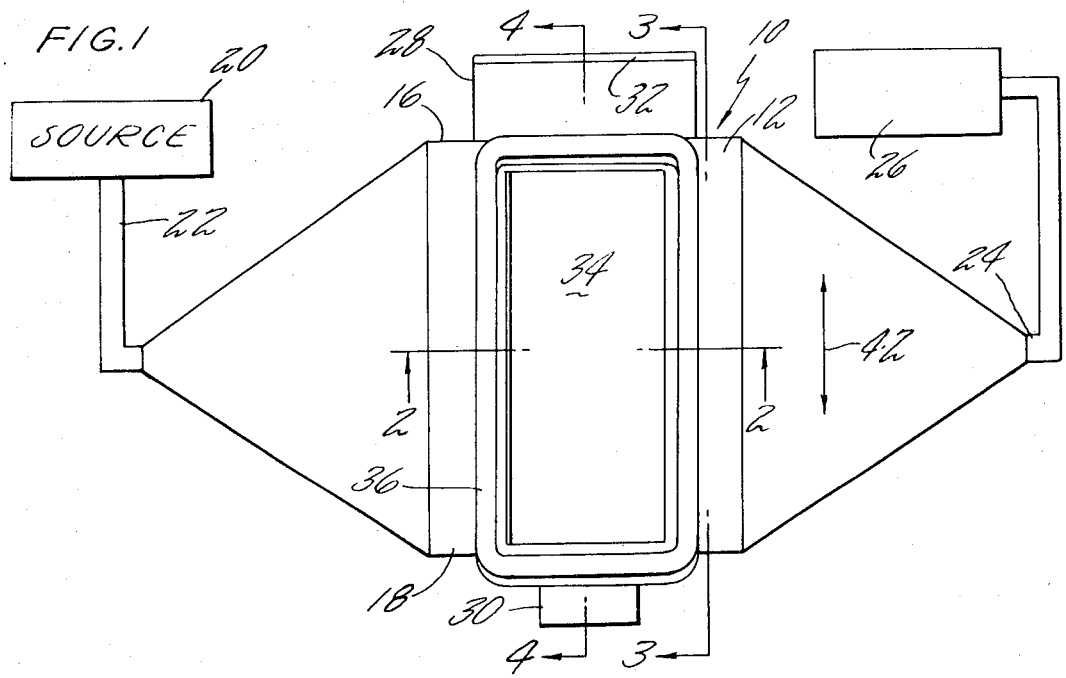
FIG. 1 is a schematic plan view of an exemplary embodiment of the present invention broken away from the surrounding environment.

A cross-field scan laser system according to the present invention is shown plan view in FIG. 1. A rectangular channel assembly 10 having an upper wall 12, a lower wall 14 (not visible in this figure) and a pair of side walls 16 and 18 is constructed essentially of electrical insulation material that can withstand continual cycling of vacuum, pressure and heat conditions. A source 20 of laser gas is connected by a conduit 22 to the channel assembly which in turn is connected by a conduit 24 to a sump 26. A pair of mirror mounts 28, 30, each of which contains a mirror assembly as will be discussed in more detail hereinafter, is attached directly to the side walls 16, 18 respectively. The mount 28 has an optical window 32 which in the case of a carbon dioxide laser is typically a salt flat sealably attached thereto to form a pressure seal between the gases internal of the channel assembly and the conditions surrounding the channel assembly. Also visible in FIG. 1 are an upper permanent magnet 34 and an upper alternating current magnetic field producing coil 36.

Figure 2:
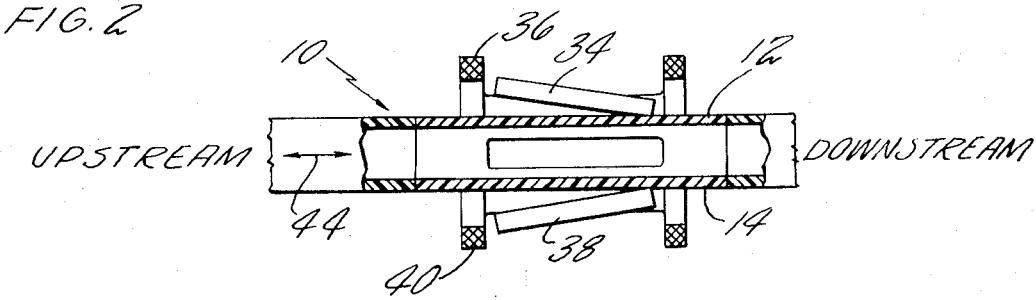
FIG. 2 is a sectioned elevation taken along the line 2—2 of FIG. 1.

FIG. 2 is a view taken along the line 2—2 showing the channel assembly 10 in elevation. Both the magnet 34 and the coil 36 have corresponding elements which lie beneath the channel assembly as is shown in FIG. 2 as lower permanent magnet 38 and lower AC magnetic coil 40. All of the magnetic field producing elements 24–30 are positioned adjacent to the channel assembly and have a particular alignment with respect thereto. The magnets 34, 38 are essentially parallel to the upper wall 12 and the lower wall 14, respectively, in the transverse direction which is shown in FIG. 1 as the double-headed arrow 42. Further, separation between the magnets 34, 38 is greater toward the upstream end of the channel than toward the downstream end of the channel. In a somewhat analogous fashion, the magnetic coils 36, 40 are essentially parallel to the upper and lower walls 12, 14, respectively, in the longitudinal direction which is shown in FIG. 2 as a double-headed arrow 44; the separation between the coils 36, 40 is greater at mount 30 than at mount 28.

Figure 3:
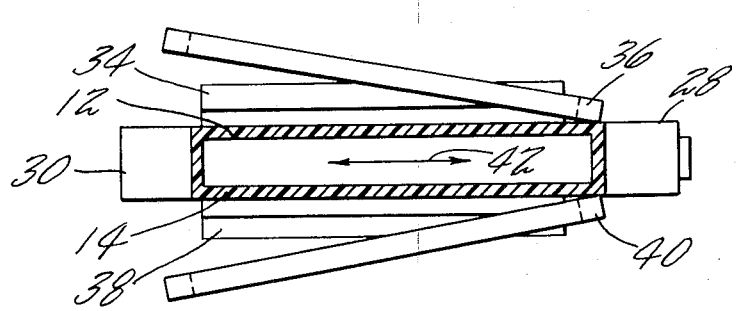
FIG. 3 is a sectioned elevation taken on the line 3—3 of FIG. 1.

A view along the line 3—3 forms FIG. 3 and shows in greater detail the relative positioning of the magnetic coils with respect to the flow channel. FIG. 3 is essentially an end elevation view through the channel assembly looking upstream from a downstream position. Immediately adjacent to the upper wall 12 and lower wall 14 are respectively the upper magnet 34 and the lower magnet 38. The magnets 34, 38 are parallel to the upper and lower plates of the channel assembly in the transverse direction and they form an acute included angle between their facing surfaces in the upstream-downstream direction. In an analogous fashion, the coils 36, 40 are parallel to one another in the upstream-downstream direction but their inner surfaces form an acute included angle in the direction transverse to the gas flow.

Figure 4:
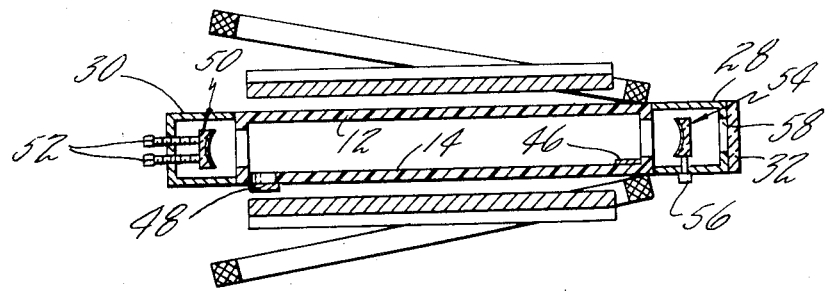
FIG. 4 is a sectioned elevation taken on the line 4—4 of FIG. 1.

FIG. 4 is a view along the line 4—4 of FIG. 1 showing some of the internal detail of the scan laser. The upper and lower magnetic coils and the upper and lower magnets are shown immediately adjacent to the upper and lower walls of the channel assembly. Adjacent the mirror mount 28 is a strip anode 46; a cathode 48 is positioned adjacent to the mirror mount 30 but below the lower wall 14. A mirror assembly 50 is adjustably mounted internal of the mirror mount 30 and is precise alignment is controllable with the adjusting screws 52. The mirror mount 28 contains a mirror assembly 54 which is adjustably mounted and its alignment is controllable by the adjusting screw 56. An optical passage 58 is located behind the mirror assembly 54 and the optical window 32 which is optically transparent to the laser wavelength is permanently attached to the mirror mount 28 to form a pressure seal.

Figure 5:
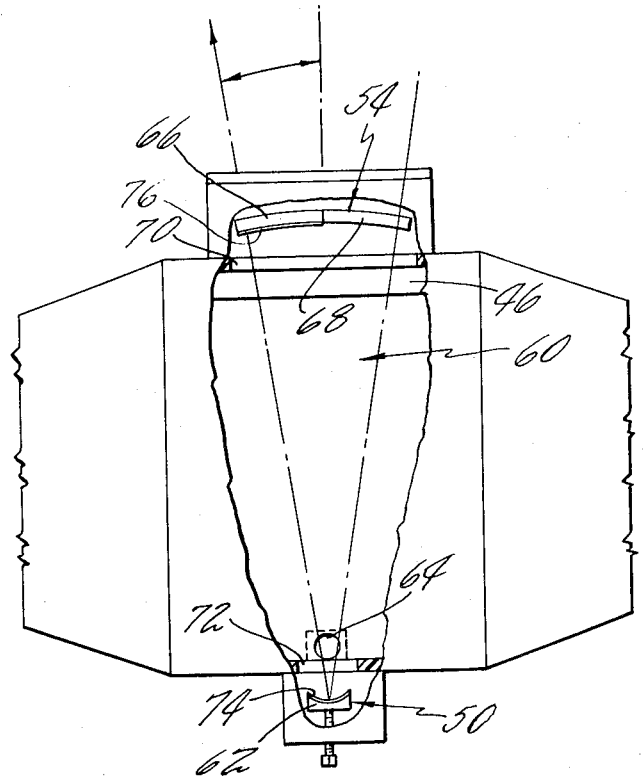
FIG. 5 is a partially broken away, schematic plan view showing resonator detail of the embodiment of the present invention shown in FIG. 1.

In the partially broken-away schematic embodiment shown in FIG. 5, an angularly degenerate split confocal resonator 60 is shown in greater detail. The mirror assembly 50 contains a fully reflecting pivot mirror 62 which is located adjacent the cathode structure and out of the stream of flowing gas. An electrode hole 64 which passes through the lower wall is located immediately above the cathode. The mirror assembly 54 which includes a partially transmitting mirror 66 and a totally reflective mirror 68, is located adjacent to the strip anode electrode and out of the gas stream. A relatively long rectangular slit 70 and a shorter rectangular slit 72 are located in the side walls 18 and 16, respectively, to allow optical interaction between the mirror assemblies. An aperture device 74 and a slot aperture device 76 are positioned adjacent to the pivot mirror 62 and the partially transmitting mirror 66, respectively.

The cross-field scan laser shown in FIGS. 1–5 is operated as a convectively cooled, transverse flow gas laser having magnetic means to balance or neutralize the forces on the plasma which are due to the gas flow effects and separate magnetic means to cause the laser column to be scanned. The system has been operated with various gases over a wide range of pressures; typical gas parameters include a mixture of carbon dioxide, nitrogen, helium gas mixture in the proportions of one-to-one-to-eight respectively and operated at between one and seventy-five torr pressure, although other proportions of the same gases and other gas combinations entirely will perform satisfactorily with this device. In operation, the laser gas is flowed from the source through the channel assembly and then to the sump. An electric potential is maintained between the cathode and the anode, the potential being sufficiently high that the resulting electric field gradient causes a plasma to form in the channel assembly between the anode and cathode electrodes. Since laser gas is flowing through the channel assembly, there is a tendency for the discharge plasma to bow or be blown in the downstream direction out of the lateral extent of the optical cavity thereby causing problems with laser control and efficiency. To counteract this effect a magnetic field having an intensity which is tapered in the direction of flow and increasing in the downstream direction is impressed upon the discharge plasma by the magnets 34, 38; the field is transverse to both the current flow in the discharge and the gas flow through the channel assembly. When the electric current (V) which flows in direction 42 interacts with the magnetic field (B) which is maintained in the vertical direction between the magnets 34, 48, a force (F) is produced in the longitudinal direction 44. This force acts on the discharge in the upstream direction and stabilizes it against the forces due to gas flow. The magnetic stabilization of a plasma against the effects of gas flow is essential to the operation of the present invention, and a very complete description of this phenomenon is provided in the publication by C. J. Buczek et al., Magnetically Stabilized Cross Feld $CO_2$ Laser, Applied Physics Letters 16, pp. 321–323 (1970).

Once the plasma has been stabilized as a straight line discharge in the optical resonator which will be described further hereinafter, an electrical current is applied to the magnetic coils 36, 40 causing the plasma column to scan through the optical cavity in a manner responsive to the variations in current applied to the coils. For example, if the current applied to the coils is a sinusoidal current the discharge is cyclically scanned through the optical cavity; various other time varying currents can be applied to the coils thereby producing corresponding time variant angular displacements in the electric discharge. As is apparent from FIGS. 3 and 4 in particular, the magnetic field produced by the scan coils 36, 40 is of variable intensity, being most intense immediately adjacent the mirror mount 28 and least intense adjacent the mirror mount 30. When the variable intensity scan magnetic field is applied to the straight line plasma in the resonator, one end of the plasma column pivots about a point on the surface of the pivot mirror 62 while the other end of the plasma column sweeps through an arc whose limits are determined by the size of the mirror assembly 54 and the strength of the scan magnetic field. The scan magnetic coils 34, 38 are appropriately tilted so that the plasma column which experiences a graduated magnetic field is maintained essentially straight throughout the scan; while one end thereof is moved horizontally throughout the entire range of the scan, the other end undergoes esesntially no horizontal movement and all stations intermediate these two extremes undergo a horizontal displacement which is proportional to their relative positions between the end points.

The present invention requires that the optical cavity be a degenerate resonator which is defined as an optical cavity capable of oscillating in more than one direction. The embodiment shown in FIG. 5 is angularly degenerate although linearly degenerate cavities, as will be discussed further, are also functionable. Further, the resonator must be properly aligned if the plasma displacement within the cavity is to produce a corresponding scan motion with the laser output beam. The laser energy that is released by the excited gas in the electric scanned discharge folds back on itself for all angular positions of the discharge due to the angularly degenerate mirror arrangement. In the embodiment shown in FIG. 5, each of the mirrors 62, 66 and 68 has a radius of curvature equivalent to the separation between the mirror assemblies 50, 54. Since the mirror orientation is such that any reflected energy impinging perpendicularly to the surface of a given mirror at any angle can retrace its path through the resonator, laser action is assured for all positions of the discharge column within the optical resonator. The cooperating mirrors forming the resonator 60 cause most of the energy impinging on the surface of the partially transmitting mirror 68 at an angle perpendicular to its surface to be reflected onto the pivot mirror 62 and folded back to the fully reflecting mirror 66 which is adjacent to the miror 68; the energy so directed then retraces its path to the pivot mirror and back to the partially transmitting mirror. The overall effect of pivoting the electric discharge about a point on the surface of the mirror 62 is that the laser device can be made to emit energy along any direction in which the plasma discharge is aligned within the resonator.

The resolution of the beam produced with the present invention depends on the spot size of the optical mode being propagated in the resonator and on the angle through which the plasma is scanned. As a practical matter, the scan angle is limited to the range of from zero to 90° and for any given physical arrangement the resolution of laser beam spot can be increased or decreased by appropriate tailoring of the spot size of the optical mode at the surfaces of the mirrors. For reasons which are well known in the field of optics, the system described herein produces the best resolution when the mode size at the pivot mirror surface is maximized and this in turn requires that the mode size at the fully reflecting mirror surface as well as the partially transmitting mirror be minimized. The tailoring of mode size for a given optical resonator is accomplished by providing appropriate apertures to the surfaces of the mirrors making up the resonator cavity. Additional detail on the control of mode size with apertures is provided in G. D. Boyd et al., Generalized Confocal Resonator Theory, Bell System Technical Journal 41, pp. 1347–1369 (1962).

The electrode geometries of both the anode and the cathode are tailored so that they present an attachment surface for the discharge current wherever the plasma may be in the resonator in order to support lasing in the region desired. The anode electrode is preferably in the form of a strip of conducting material which is located in the stream of flowing gas and adjacent to the mirror assembly 54 so that the plasma can conveniently attach to the electrode regardless of its position within the resonator. The cathode electrode is constructed from a conducting material and is preferably positioned outside of the path of the gas flow as is shown in FIG. 4 in order to eliminate the difficulties caused by the interaction of the cathode fall region and the scanning magnetic field. If the cathode is located in the gas flow in a position corresponding to the anode, the cathode fall region which has an inhomogeneous electric field with respect to the main discharge column, undergoes erratic movement when subjected to the scanning magnetic field. However, locating the cathode near but beneath the optical region avoids the need to move the cathode fall region of the discharge and the full gain potential of the straight positive discharge column is available to the mode propagated in the resonator. The location of the cathode outside of the gas flow and adjacent to the pivot mirror just described is not critical to the functioning of this device but is one exemplary arrangement whereby the cathode fall region is separated from the optical cavity region; it is this separation rather than the particular embodiment selected to accomplish the separation which is very important to the functioning of this device.

While the present invention is discussed in terms of a particular split confocal resonator which is described in detail by L. Beiser, Mode Formation and Selection in the Modified Confocal Resonator, Applied Physics Letters, vol. 13, No. 3, pp. 87–88, Aug. 1, 1968, various other angularly degenerate resonator arrangements exist and are sometimes desirable. For example, some of the reflecting optics can obviously be replaced by transmitting optics. An unfolded cavity equivalent which is a suitable alternate embodiment to the resonator described can be accomplished by replacing the pivot mirror with an equivalent transmitting lens and rearranging the remaining mirrors.

The exemplary embodiment shown in FIGS. 1–5 is a system having a fully reflecting pivot mirror 62, a fully reflecting scan mirror 66 and a partially transmitting scan mirror 68; this resonator produces a single output laser beam which can be scanned over the angle shown in FIG. 5. Other angularly degenerate resonator cavities with different output characteristic are equally practical. For example, if the fully reflecting scan mirror 66 were replaced by a partially reflecting mirror, two output laser beams would be produced. Alternatively, the partially transmitting scan mirror 68 could be replaced by a fully reflecting scan mirror and the fully reflecting pivot mirror 62 replaced with a partially transmitting pivot mirror to provide a two-output laser beam with the output being taken through the mount 30 instead of mount 28. Other mirror and/or lens combinations which comprise angularly degenerate arrangements are readily substitutable.

While the present invention has been described in terms of a scannable laser in which one end of the discharge column is essentially stationary or pinned and the other end is traversed over an arc, a different embodiment of this invention takes the form of a linear scan device. In the linear scan embodiment the resonator cavity is modified considerably from that shown in FIG. 5. For example, a degenerate optical resonator is made up with planar mirrors, and both ends of the discharge column are moved over identical scan distances simultaneously. Additionally, a linearly degenerate optical resonator is made up with a continuous planar mirror and a cooperating mirror whose surfaces comprise a linear array of spherical mirror segments providing a series of separated discrete optical cavities within the resonator. The discharge in such a device is stabilized magnetically as was described previously and the tilted position of the magnetic coil with respect to the rectangular channel assembly is revised accordingly.

Although the invention has been shown and described with respect to preferred embodiments thereof, it should be understood by those skilled in the art that various other changes and omissions in the form and detail thereof may be made therein without departing from the spirit and the scope of the invention.

Having thus described typical embodiments of our invention, that which we claim as new and desire to secure by Letters Patent of the United States is:

1. A continuous flow scan laser comprising:
 a channel assembly through which a laser gas is flowed in a longitudinal direction;
 a degenerate optical resonator which is disposed within the channel assembly and which has a plurality of optical paths essentially transverse to the longitudinal direction;
 means for providing an electric field gradient along the optical gain paths to produce an electric discharge plasma in the gas;
 means for magnetically stabilizing the plasma to a substantial straight discharge along an optical path within the resonator, the magnetic stabilization means providing a magnetic field which is essentially transverse with respect to both the longitudinal direction and the straight discharge; and
 means for magnetically manipulating the location of the stabilized discharge within the resonator, the manipulating means providing a magnetic field which is essentially transverse with respect to both the longitudinal direction and the straight discharge.

2. The scan laser according to claim 1 wherein the resonator is a fixed mirror angularly degenerate optical cavity comprising:
 a fully reflecting mirror having a spherical reflection surface;
 a fully reflecting pivot mirror having a spherical reflection surface which cooperates optically with the reflecting mirror; and
 a partially transmitting spherical mirror which cooperates optically with the pivot mirror.

3. The scan laser according to claim 1 wherein the resonator is a fixed mirror angularly degenerate optical cavity comprising:
 a fully reflecting pivot mirror having a spherical reflection surface; and
 a partially transmitting mirror which cooperates optically with the pivot mirror.

4. The scan laser according to claim 1 wherein the resonator is a fixed mirror angularly degenerate optical cavity comprising:
 a fully reflective mirror having a spherical reflection surface; and
 a partially transmitting spherical pivot mirror which cooperates optically with the reflective mirror.

5. The scan laser according to claim 1 wherein the resonator is a fixed mirror degenerate optical cavity comprising:
 a fully reflecting mirror having a flat reflection surface; and
 a partially transmitting flat mirror which cooperates optically with the fully reflecting mirror.

6. The scan laser according to claim 1 wherein the resonator is a fixed mirror degenerate optical cavity comprising:
 a first mirror having a flat surface; and
 a second mirror comprising a plurality of discreet spherical surfaces.

7. The scan laser according to claim 6 wherein either of the first or second mirrors is partially transmitting.

8. The scan laser according to claim 2 wherein apertures are located in front of the surfaces of each mirror, the size of the apertures being selected so that the resonator mode size at the pivot mirror surface is maximized thereby minimizing the mode size at both the reflecting scan mirror and the partially transmitting scan mirror.

9. The scan laser according to claim 1 wherein the means for producing the electric field gradient comprises:
 a strip anode which is located in the channel assembly;
 a cathode which is located external to the channel assembly so that the negative fall region of electric discharge plasma occurs outside of the resonator;
 a source of electric power; and
 means for electrically connecting the anode and the cathode to the source.

10. A method of operating a continuous flow scan laser which comprises:
 establishing a flow of a laser gas in a channel which passes transversely through a degenerate optical resonator cavity;
 producing a plasma in the resonator by discharging an electric current transversely across the gas flowing therethrough;
 stabilizing the plasma in the resonator against the effects of flow by applying to the plasma a first magnetic field which is transverse to both the direction of gas flow and the direction of the electric discharge; and
 sweeping the stabilized plasma within the resonator by applying a variable magnetic field which is essentially parallel to the first magnetic field.

References Cited

UNITED STATES PATENTS 3,509,487   4/1970   Bouwhuis et al. ____ 331—94.5
3,521,193   7/1970   Wingfield et al. ____ 331—94.5

WILLIAM L. SIKES, Primary Examiner

U.S. Cl. X.R.

350—160